(12) United States Patent
Morales et al.

(10) Patent No.: US 8,149,438 B2
(45) Date of Patent: Apr. 3, 2012

(54) DISTRIBUTED PRINTING SYSTEM WITH IMPROVED LOAD BALANCING

(75) Inventors: Javier A. Morales, Rochester, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1058 days.

(21) Appl. No.: 11/364,397

(22) Filed: Feb. 28, 2006

(65) Prior Publication Data

US 2007/0201077 A1 Aug. 30, 2007

(51) Int. Cl.
*G06K 15/10* (2006.01)
(52) U.S. Cl. .......................... 358/1.15; 358/1.1
(58) Field of Classification Search ................. 358/1.13, 358/1.15, 1.1
See application file for complete search history.

(56) References Cited

U.S. PATENT DOCUMENTS

| | | | |
|---|---|---|---|
| 5,051,779 A | 9/1991 | Hikawa | |
| 5,130,806 A | 7/1992 | Reed et al. | |
| 5,220,674 A | 6/1993 | Morgan et al. | |
| 5,263,994 A * | 11/1993 | Ueda | 400/157.3 |
| 5,287,194 A | 2/1994 | Lobiondo | |
| 5,337,258 A * | 8/1994 | Dennis | 714/47 |
| 5,398,289 A | 3/1995 | Rourke et al. | |
| 5,450,571 A | 9/1995 | Rosekrans et al. | |
| 5,467,432 A * | 11/1995 | Ota | 358/1.13 |
| 5,467,434 A | 11/1995 | Hower, Jr. et al. | |
| 5,524,085 A | 6/1996 | Bellucco et al. | |
| 5,579,447 A | 11/1996 | Salgado | |
| 5,666,470 A | 9/1997 | Parker | |
| 5,692,111 A | 11/1997 | Marbry et al. | |
| 5,978,560 A | 11/1999 | Tan et al. | |
| 5,995,721 A | 11/1999 | Rourke et al. | |
| 6,573,910 B1 * | 6/2003 | Duke et al. | 715/740 |
| 6,574,629 B1 * | 6/2003 | Cooke et al. | 1/1 |
| 6,783,288 B2 * | 8/2004 | Kato | 400/61 |
| 6,825,943 B1 | 11/2004 | Barry et al. | |
| 6,873,426 B1 | 3/2005 | Farrell | |
| 6,930,795 B1 | 8/2005 | Motamed et al. | |
| 6,967,728 B1 * | 11/2005 | Vidyanand | 358/1.12 |
| 7,106,472 B2 * | 9/2006 | Gomez et al. | 358/1.15 |
| 7,158,247 B2 * | 1/2007 | Simpson et al. | 358/1.15 |

(Continued)

FOREIGN PATENT DOCUMENTS

| | | | |
|---|---|---|---|
| JP | 2003255775 A | * | 9/2003 |
| JP | 2003330670 A | * | 11/2003 |
| JP | 2008084325 A | * | 4/2008 |

*Primary Examiner* — Benny Q Tieu
*Assistant Examiner* — Eric A Rust
(74) *Attorney, Agent, or Firm* — Kermit D. Lopez; Luis M. Ortiz; Melissa Asfahani

(57) ABSTRACT

A method is provided for managing a print job in a distributed printing system including a first printing system having a first default operating mode with a first rated output and a second printing system having a second default operating mode with a second rated output. The method includes determining that the second printing system has the capability to operate in an adjusted operating mode with an effective output that differs from either the first rated output or the second rated output. In practice the print job is split into first and second job portions in such a way that when (a) both the first and second print job portions are communicated to the distributed printing arrangement, (b) the first print job portion is printed at the first printing system in the first default operating mode, and (c) the second print job portion is printed at the second printing system in the adjusted operating mode, printing of the first and second print job portions end substantially simultaneously.

20 Claims, 6 Drawing Sheets

U.S. PATENT DOCUMENTS

| | | |
|---|---|---|
| 7,161,696 B2 * | 1/2007 | Yamamoto et al. .......... 358/1.15 |
| 7,265,860 B2 * | 9/2007 | Ferlitsch .................... 358/1.15 |
| 7,391,528 B2 * | 6/2008 | Kacker et al. ............... 358/1.15 |
| 7,433,062 B2 * | 10/2008 | Takahashi .................. 358/1.13 |
| 2002/0101604 A1 * | 8/2002 | Mima et al. ................. 358/1.15 |
| 2003/0133134 A1 * | 7/2003 | Dimperio et al. ............ 358/1.1 |
| 2005/0065830 A1 | 3/2005 | Duke et al. |
| 2005/0154998 A1 * | 7/2005 | Mathieson ................... 715/809 |
| 2006/0139686 A1 * | 6/2006 | Suzuki et al. ............... 358/1.15 |
| 2006/0250638 A1 * | 11/2006 | Wang et al. ................. 358/1.15 |
| 2008/0079963 A1 * | 4/2008 | Matsubara ................... 358/1.9 |
| 2008/0259360 A1 * | 10/2008 | Kacker et al. ................ 358/1.6 |
| 2009/0157351 A1 * | 6/2009 | Rai et al. ..................... 702/179 |

\* cited by examiner

DISTRIBUTED PRINTING SYSTEM WITH IMPROVED LOAD BALANCING

CROSS-REFERENCE TO RELATED APPLICATIONS

Cross-reference is made to U.S. patent application Ser. No. 11/364,758 that was filed on the same day as the present application by the same inventors and assignee and which is herein incorporated by reference.

BACKGROUND AND SUMMARY

The disclosed embodiments relate to the area of distributed printing and contemplates distributing print job portions among two or more printing devices pursuant to a technique that uses information about the actual or effective outputs of the respective printing devices to permit printing of the print job portions to end substantially simultaneously.

Known distributed printing systems, such as client/server printing networks, include one or more servers and multiple printers associated with the server. In such systems, first-in-first-out (FIFO) queuing is often used. Typically, a job from a particular user is sent to a particular user-defined and selected printer. Such a system does not optimally utilize its resources, as certain printers inevitably handle more job requests than other available printers. In such a scenario, one particular printer may have a long job queue and long delay times in printing while other networked printers are in an idle state (i.e., not in current use).

Distributed printing systems have been designed in an attempt to improve on this by providing some degree of load balancing. In such systems, if a selected output device is in use, the job request will be spooled to an available printer within the distributed system or print "cluster." Such a system may provide limited load balancing by, for instance, distributing a 1/N job portion to each one of N target printers.

An improvement to the above-described distribution scheme disclosed in U.S. Pat. No. 5,978,560 to Tan et al. where job portions (e.g., groups of job sets) are distributed within a distributed printing system based on more detailed information about the particular attributes of each output device. It is also known, as disclosed by U.S. Pat. No. 5,287,194 to Lobiondo, that jobs can be partitioned prior to distribution within a distributed printing system:

If the network has available printers, but a single printer is incapable of completing the job by a required time, the scheduler can allocate portions of the job to a plurality of printers which can print the job in parallel to speed up the completion time to meet the requested time constraints. This may include allocating or dividing the job between a plurality of printers at locations remote from one another. The user is then informed where the job is being printed and when completion is expected.

Various prior art disclosures contemplate the use of some "intelligence" in distributing parts of a print job within a distributed printing environment. For instance, U.S. Pat. No. 6,825,943 to Barry et al. discloses a method in which a print job is partitioned into select portions according to defined boundaries; a substitute RIP instruction is generated for each select portion of the print job; and the RIP requirements of each select portion is processed in an assigned one of a plurality of RIP engines according to the substitute RIP instruction. Additionally, U.S. Pat. No. 5,995,721 to Kishida relates generally to a distributed printing system with a plurality of document processing subsystems where the attributes of a document are examined for the purpose of delivering multiple portions of the document to multiple ones of the plurality of document processing subsystems on the basis of the examination.

U.S. Pat. No. 6,930,795 to Motamed et al. discloses software for, among other things, (1) routing jobs to the most available printer based on color use, pages per minute, number of pages per said job, size, and number of copies for jobs already in a queue and number of copies of the job sent, (2) automatically splitting job copies across specified number of printers meeting job criteria, (3) automatically splitting a single copy that is a long job across more than one printer, (4) supporting mixed groups of printers, wherein they do not all need to be the same make and model, (5) monitoring the status of a print job and redirecting the job if an error occurs, (6) supporting job scheduling by allowing a user to specify job priority, with password required for rush jobs, and for specifying job rip and print scheduling in advance, and (7) supporting specified non-proprietary black and white printers.

The pertinent portions of the above-mentioned patents are incorporated herein by reference The prior art systems do not appear to appreciate the value of splitting a job, for the purpose of sending resulting portions to target printing devices in a distributed printing arrangement, proportionate to the respective output rates of the target printing devices. Without such appreciation, however, it appears difficult to distribute the resulting portions across the target printing devices and complete printing of the portions substantially simultaneously. It would therefore be desirable to provide a system that splits a job proportionate to the print speeds of the target printing devices.

Additionally, the above-described print distribution systems are not necessarily well suited for operation in an environment where the operation of at least one of the distributed or clustered print devices deviates from its rated output. In particular, it is known that execution of a significant number of job requirements can cause a given printer to produce prints above or below its anticipated rated output. In one example, a printer may produce prints at a lower than expected rate when operating in an "emulation mode." In another example, the same printer may produce prints at higher than expected output rate (i.e., at an effective rate that is higher than the rated output) when two or more copies of the same image are printed on the same side of a single print media side in a "plural-up" printing mode, and the resulting multi-image output sheets are then cut into single image sheets. For the sake of accurately splitting a print job, for delivery of the portions to the target printing devices of a distributed printing arrangement, it would be desirable, pursuant to job splitting, to know the projected effective output rate of the target printing device in the distributed printing arrangement.

Finally, a suitable splitting of the print job may not be achievable unless a full understanding of the operational modes of each target printing device is obtained. For instance, adding an image processing capability for one target printing device, such as "image quality interoperability (a feature provided in selected printing devices sold by Xerox Corporation)" may decrease the effective output rate of a target printing device, while a plural-up capability, as described above, may increase the effective output rate of the target printing device. It would be desirable, pursuant to job splitting, to fully comprehend the operational capabilities of the target printing devices to which the respective job portions are to be sent.

In accordance with one aspect of the disclosed embodiments, there is provided a print job distribution system for printing a print job. The print job distribution system includes: a print job distribution controller; a distributed printing arrangement communicating with the print job distribution controller, the print job distribution arrangement including a first printing system having a first rated output and a second printing system having a second rated output; the first and second printing systems having first and second default operating modes, respectively, and the second printing system having an adjusted operating mode with an effective output that differs from either the first rated output or the second rated output; a print job distribution application for operation with the print job controller; and the print job distribution application being adapted to split the print job into first and second print job portions, the first and second print job portions being split in such a way that when (a) both the first and second print job portions are communicated to the distributed printing arrangement, (b) the first print job portion is printed at the first printing system in the first default operating mode, and (c) the second print job portion is printed at the second printing system in the adjusted operating mode, printing of the first and second print job portions end substantially simultaneously.

In accordance with another aspect of the disclosed embodiments, there is provided a print job distribution system for printing a print job. The print job distribution system includes: a print job distribution controller; a distributed printing arrangement communicating with the print job distribution controller, the print job distribution arrangement including a first printing system operable in a first default operating mode in which a first set of default features is made available and a second printing system operable in a second default operating mode in which a second set of default functions is made available; the second printing system being operable in an enhanced operating mode in which a third set of features is made available, the third set of features including at least one more feature than is available in the second set of default features; a print job distribution application for operation with the print job controller; and the print job distribution application being adapted to split the print job into first and second print job portions, the first and second print job portions being split in such a way that when (a) both the first and second print job portions are communicated to the distributed printing arrangement, (b) the first print job portion is printed at the first printing system in the first default operating mode, and (c) the second print job portion is printed at the second printing system in the enhanced operating mode, printing of the first and second print job portions end substantially simultaneously.

In accordance with yet another aspect of the disclosed embodiments, there is provided a method for managing a print job in a distributed printing system including a first printing system having a first default operating mode with a first rated output and a second printing system having a second default operating mode with a second rated output. The method includes: determining that the second printing system has the capability to operate in an adjusted operating mode with an effective output that differs from either the first rated output or the second rated output; and splitting the print job into first and second job portions in such a way that when (a) both the first and second print job portions are communicated to the distributed printing arrangement, (b) the first print job portion is printed at the first printing system in the first default operating mode, and (c) the second print job portion is printed at the second printing system in the adjusted operating mode, printing of the first and second print job portions end substantially simultaneously.

DESCRIPTION OF ONE OR MORE EMBODIMENTS

Figure 1:
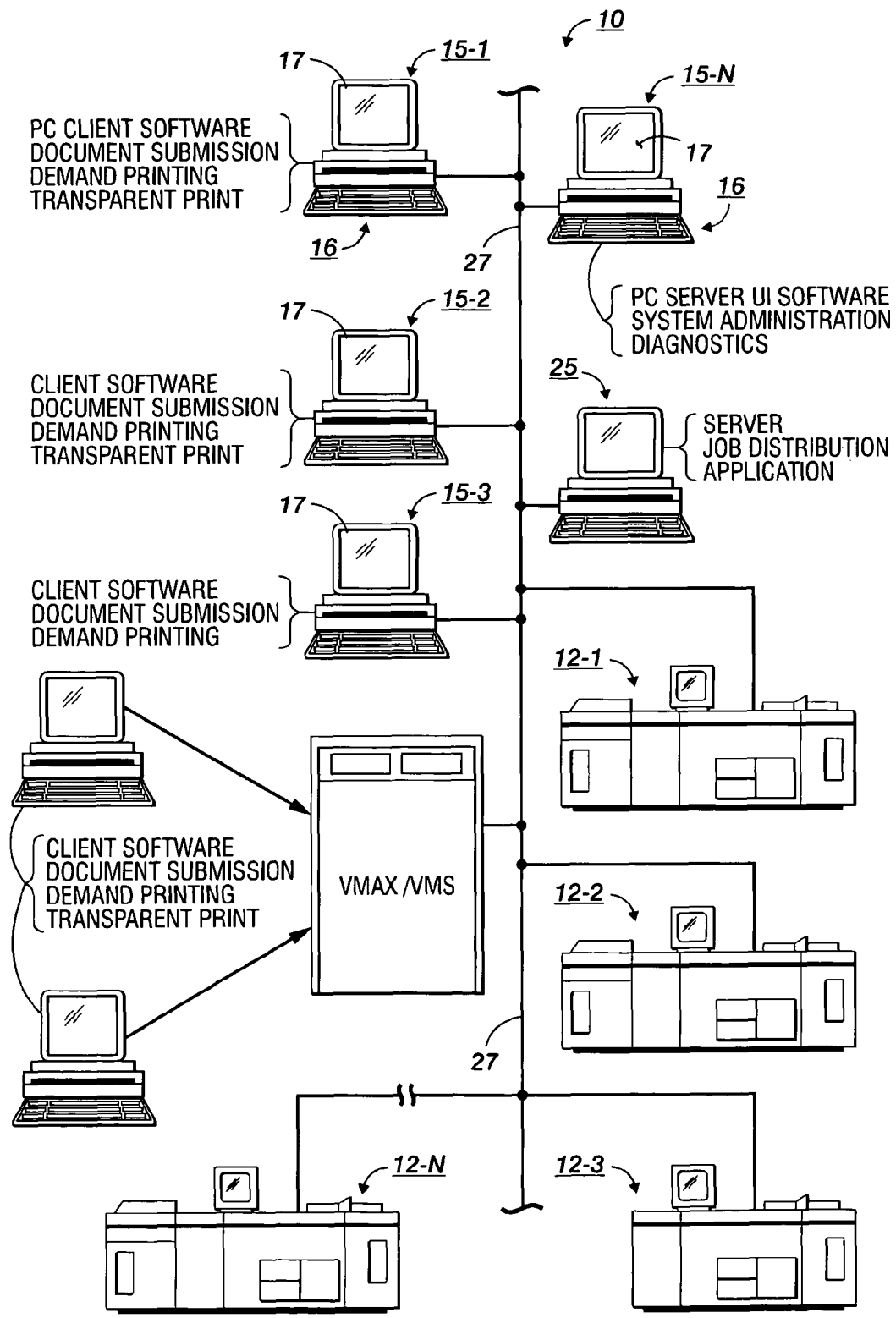
FIG. 1 is a schematic, elevational view of a network printing system capable of employing a job distribution system of the disclosed embodiments.

Referring to FIG. 1, there is shown an exemplary network document processing system 10 of the type adapted to incorporate the disclosed. Processing system 10 comprises a plurality of printers 12-1, 12-2, 12-3, . . . 12-n for processing print jobs and making prints in accordance with the job programming instructions for each job printed. Each of printers 12-1, 12-2, 12-3, 12-n may be any suitable printer capable of producing prints on a print media such as paper from video image signals and may, for example, comprise laser printers, ink jet printers, digital copiers, highlight or full process color printers, ionographic printers, combinations of the aforesaid devices, etc. In system 10, where multiple printers are integrated into a network processing system, individual printers typically have different document processing capabilities.

System 10 provides print processing for various workstations or clients 15-1, 15-2, 15-3, . . . 15-n. Clients 15-1, 15-2, 15-3, . . . 15-n, which may be remote and/or on site, are operatively coupled to printers 12-1, 12-2, 12-3, 12-n through server 25 as will appear. As will be appreciated, while only one server and a limited number of document processing apparatuses are shown in FIG. 1, the preferred embodiment contemplates the use of as many servers and document processing units as required to meet the demands of the users of the system. Clients provide the electronic documents that are the source of the print jobs and for this purpose individual ones or all of clients 15-1, 15-2, 15-3, . . . 15-n may have a document scanner, disk input, keyboard, fax, etc. for generating the electronic documents that comprise the job to be printed. Clients 15-1, 15-2, 15-3, . . . 15-n have a User Interface (UI) 16 with interactive screen 17, the UI enabling programming selections for print jobs to be made. In practice, various programming selections available in the form of a job ticket may be displayed on screen 17. Printers 12-1, 12-2, 12-3, . . . 12-n, clients 15-1, 15-2, 15-3, . . . 15-n, and server 25 are operatively interconnected by a conventional network or communication channel 27.

As used herein, the printers 12-1, 12-2, 12-3, . . . 12-n, when considered in combination, preferably include a wide range of attributes. In one example, at least one of the printers would be capable of operating in one of several modes, namely a default image quality (IQ) mode, a print emulation mode, or image quality interoperability (IQI) mode. Print emulation, a concept well known in the art, is discussed in, among other places, U.S. Pat. No. 5,666,470 to Parker, the pertinent portions of which are incorporated by reference, and the IQI mode is employed in various printers sold by Xerox Corporation. Both of these modes are used to ensure consistent appearance across a group of printers so that the prints from one type of printer can have a similar appearance to the prints of another type of printer.

It should be appreciated that many capabilities of a printer, such as the above-mentioned modes, can be categorized as "native" or "derived." For instance, the IQ default mode would be considered "native" to the printer, while either the emulation or IQI mode would be considered "derived." The native appearance option is generally printer specific. Additionally, the IQI mode might be associated with a performance penalty and be performed with a "supplementary print job processing system."

In one example of operation, the printers 12-1, 12-2, 12-3, . . . 12-n, would be usable with many different paper sizes and would print on one or both sides of print media. Variation of paper size within a given job could alter the effective output of a target printing device. In another example, at least one of the printers would possess CMKY printing capability, and the effective output of the color printer might vary as a function of the color content of each document delivered to the printer for printing. In another example, at least one of the printers would possess imposition capability, and could print plural copies of a single image on the same side of a print media substrate in a plural up mode. An example of plural-up printing is provided in U.S. Pat. No. 5,398,289 to Rourke et al., the pertinent portions of which are incorporated herein by reference. It should be noted that plural-up printing could include a derived capability when, for instance, two copies of the same image (intended to be printed on U.S. letter sized prints) are imposed symmetrically on an 11×17 (U.S. ledger) sheet, and the sheet is cut to form two U.S. letter sized prints (each including a copy of the same image). It will be appreciated that an increase in effective output rate could also be achieved in a printing scenario where multiple different images are printed on each sheet side.

Figure 2:
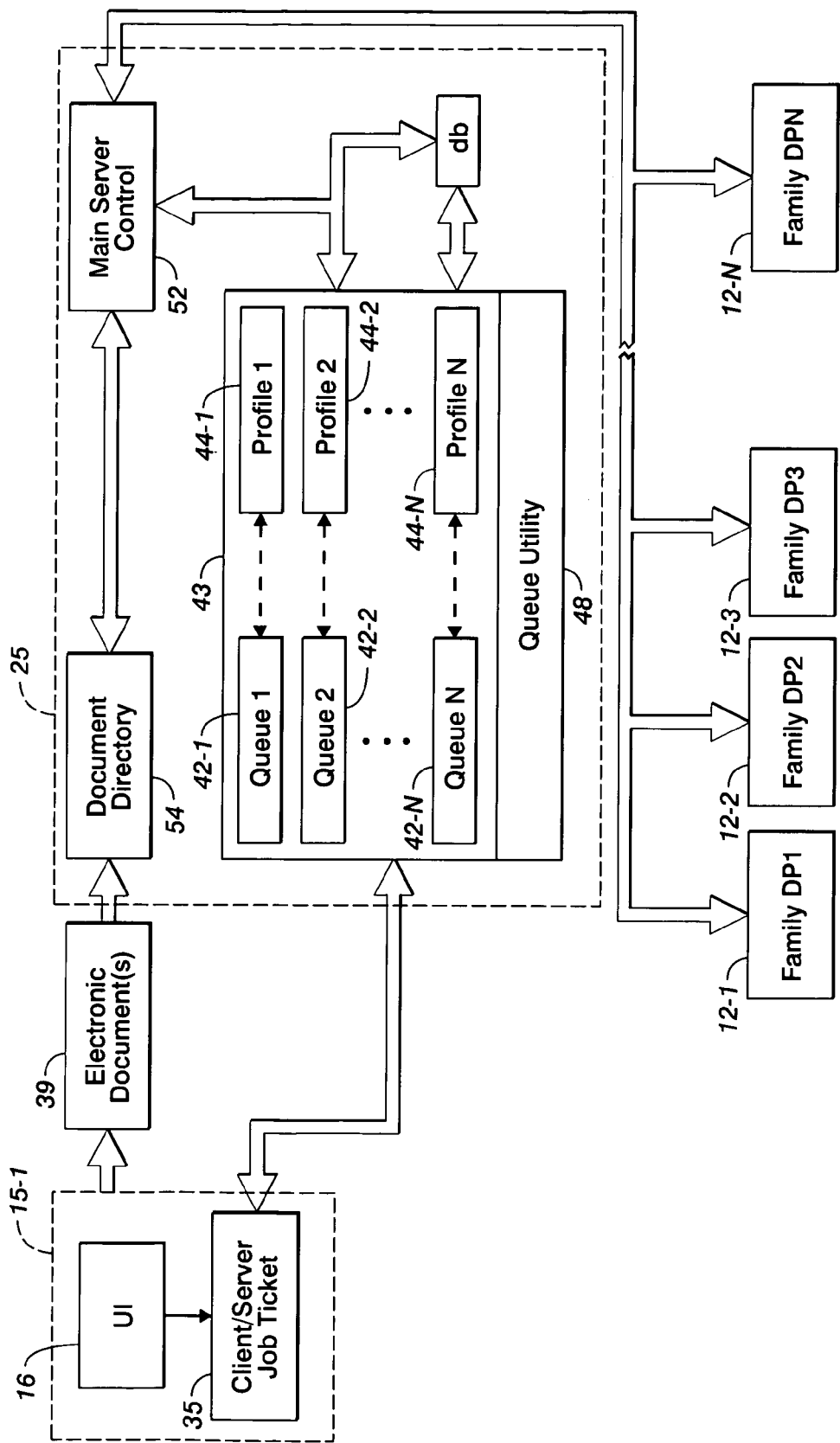
FIG. 2 is a partial, schematic, block diagrammatic view of the network printing system of FIG. 1.

Referring to FIG. 2, the relationship of a single client, such as client 15-1, to the server 25 is shown in further detail. In the illustrated embodiment of FIG. 2, the client 15-1 includes one of the UIs 16 and an electronic job ticket 35, which job ticket 35 permits the user to program a print job for transmission to the server 25. In general, the job ticket 35 includes information relating to attributes that characterize a document job. More particularly, the attributes may include, among other things, job level attributes (e.g., set quantity, copy count, finishing requirements, plex and page numbering), page level attributes (e.g., stock color separation information, image quality, reduction/enlargement and sides to be imaged), and image level attributes (e.g., size of image, color of image, location of image relative to a page). In one example, electronic document(s) 39, which includes image and attribute related information, is transmitted from the client 15-1 to the server 25.

The server 25 is also illustrated as containing a main server control 52, document directory 54, queue utility 48, and printer information set 43. The printer information set 43 contains a queue and profile for each printer. As such, queues 42-1, 42-2, and 42-N correspond to printers 12-1, 12-2, and 12-N respectively. Similarly, profiles 44-1, 44-2, and 44-N also correspond to printers 12-1, 12-2, and 12-N respectively.

In view of the above discussion, one of ordinary skill in the art will not only appreciate that a network of printers of the type shown in FIG. 1 (also referred to hereinafter as a "distributed printing arrangement") can include many native and derived capabilities, but that such capabilities may impact the rated speed of each target printer in the arrangement or cluster. For instance, a job including just simplex prints might print at the rated output of a target printer, while a job including a considerable amount of duplex printing might print well below the rated output of the target printer. In another instance, printing in an emulation mode might cause a target printer to print at an output rate that is less than rated output. On the other hand, using the derived imposition feature described immediately above (where at least two copies of the same image are printed on one sheet side), gives the appearance of a target printer printing at an output rate that is above rated speed. In yet another instance, the amount of color content in a given document may cause a target color printer to vary from its rated output.

Referring again to FIG. 1, print device clustering or load balancing generally concerns itself with the fair distribution of multiple print jobs across multiple devices, and works well if print devices have near-identical capabilities, marking behaviors, and load balancing is done across many small jobs. This functionality may fall short of ideal if the print cluster is composed of devices with different capabilities and there is a desire to ensure the job prints in the shortest possible time.

For example, if there is a desire to have the job complete in the absolute shortest time possible, load balancing [software] should attempt to schedule the print job so that it finishes in all devices at the same time. In other words, scheduling should be done so that all engines of the cluster are concurrently printing the same job from start to end regardless of each print engine's capabilities.

Current load balancing algorithms may achieve this result (although it is by no means guaranteed) by driving a print cluster that's composed of identical devices. Other techniques, such as the use of high and low "watermarks" for load balancing, are geared towards ensuring fair sharing of jobs across devices and are not necessarily intended to ensure that jobs finish printing on all devices at the same time. Load balancing will not produce desired results if the print engine's marking behaviors are dissimilar, thus resulting in visible differences in the output. This affects legacy binary printers as well as color printers.

The disclosed embodiments relate to enhancements for load balancing software (e.g., a print job distribution application operating on server 25 (also referred to hereinafter as "print job distribution controller" or an output management system ("OMS"))) to better enable the software to work with devices having dissimilar capabilities and marking behaviors. More particularly, the disclosed embodiments contemplate the applicability of system related information, such as printer output rates, media capabilities and marking behaviors to improve load balancing. The load balancing software could then use this information to distribute jobs based on, among other things, each device's print capabilities and marking behaviors. Furthermore, the load balancing software could modify the jobs (e.g., multi-up imposition, Image Quality Interoperability (IQI), selection of emulation modes or converting to a CMYK color space before load balancing) to take advantage of the media handling and image path capabilities of each target print engine in a selected distributed printing arrangement.

The following exemplary description should provide a number of perspectives regarding various aspects of the disclosed embodiments:

As contemplated, in normal operation, printers would be added to the load balancing system by the OMS as needed. When a printer is added to the system, the system will use the printer model to determine device capabilities. An example of a network printer configuration system is disclosed in U.S. Pat. No. 5,692,111 to Marbry et al., the pertinent portions of which are incorporated herein by reference. A given printer model may be determined in a variety of ways, such as by (a) reading a printer description file and matching the printer model to information stored in the system, (b) communication via a bidirectional protocol to query for device capabilities, or (c) input from the user.

Once a printer is added to the system, information about, among other things, rated outputs, media sizes associated with each rated output, and media-handling characteristics is provided. This information can then be used by the system to modify how large jobs are split amongst multiple print engines assigned to a cluster.

For example, the print job distribution application of the printer cluster ("Cluster") of FIG. 1 may be configured to include the following print systems: two type I printers (each printing, under ideal conditions, 180 letter sized pages per minute on media that's up to 8.67"×14.33") and one type II ("type I" and "type II" are arbitrary designations used herein for ease of discussion) printer (printing, under ideal conditions, 100 letter sized pages per minute on media that's up to 12.6"×18.5").

A simple scheduling example for the Cluster follows. A letter job is submitted to the Cluster, and the print job distribution application or OMS does the following:

1. Uses the rated output characteristics of each printer to determine what portion of the job should be sent to each target printer. In the current example, the overall theoretical output rate of the three printers is 460 ppm. The type II printer accounts for about 21% of that total, while each one of the type I printers accounts for 39% of the total.
2. Once the OMS determines how much of the total performance of the Cluster is attributable to each printing system, the OMS can then attempt to send the corresponding percentage of the job to each target printer. Depending on how a print job is formatted, the OMS can split the job in one of several ways:
   a. If the job came as a single job with a large quantity, the system could send the job to each engine and adjust the print quantity to the proper percentage of the original.
   b. If the job came in as a variable job, the system could divide the number of records sent to each engine using the same percentages.
   c. If the job came as a very large concatenated PDL file, the system could page split the PDL at the correct location to ensure that the proper percentage of pages went to the correct engine. A discussion regarding the assessment of PDL jobs is provided in U.S. Pat. No. 5,579,447 to Salgado, the pertinent portions of which are incorporated herein by reference.
   d. If the job came in as many small PDL files, the system could keep a running total of how many pages were being sent to each device (add PDL length and number of sets) and compare the percentage of pages sent to the device against the percentage of pages each device contributes to the overall productivity. Each job would be assigned to the device that best kept the relative percentage of printed pages for each device closest to the proper percentage of pages.
3. Over time, it is contemplated that the OMS would fine-tune the rated output of each print engine to better reflect actual performance vs ideal performance.

In another example, hereinafter referred to as the "imposition example," the same job, as in the simple scheduling example immediately above, is sent to the Cluster. In the imposition example, however, the OMS has been configured to use an imposition or plural-up mode, where appropriate. For the imposition example, the OMS will do the following:

1. Evaluate the trim size for the original document against the media capabilities of the target printers of the Cluster and decide how the subject job can be printed in the minimal time. In the imposition example, the subject job achieves maximum effective page production rate when printed one-up on the each one of the type I printers and two-up on the type II printer.
2. Using the rated outputs and the media handling characteristics of each target printer, the OMS determines what portion of the subject job should be sent to each engine. In the imposition example, this would mean comparing the rated output of each one of the type I printers with the projected effective output of the type II printer (the concept underlying the "projected effective output" is discussed in further detail below). The projected effective output of the type II printer is calculated by determining how many tabloid pages the type II printer can print per minute (type II, 100 prints: 60 ppm in Pitch Mode 3) and multiplying that number by the number of pages imposed on a sheet. In the imposition example, that would mean 60 Tabloid pages per minute—2 imposed pages per tabloid sheet equaling an effective output rate of 120 letter pages per minute.
3. From the previous calculations, the OMS determines that the Cluster can print 480 letter pages per minute. The type II printer now accounts for 25% of that total, and each one of the type I printers accounts for 37.5% of that total.
4. Once the imposition-adjusted contributions to performance of the Cluster are determined, the OMS schedules the job per step 2 of the simple scheduling example above.
5. In addition to doing the scheduling, the OMS also ensures that jobs are imposed per the assumptions made for calculating the job scheduling. The imposition may be done by updating the parameters of a job ticket (the job ticket being associated with the subject job) for imposition at a digital front end (DFE). Alternatively, the imposition could, for instance, be performed locally on the OMS (or at a network device upstream of the OMS) before sending the corresponding job to the type II printer. In either case, the OMS would update the job ticket to reflect the assumed media used for the scheduling calculations.

Figure 1A:
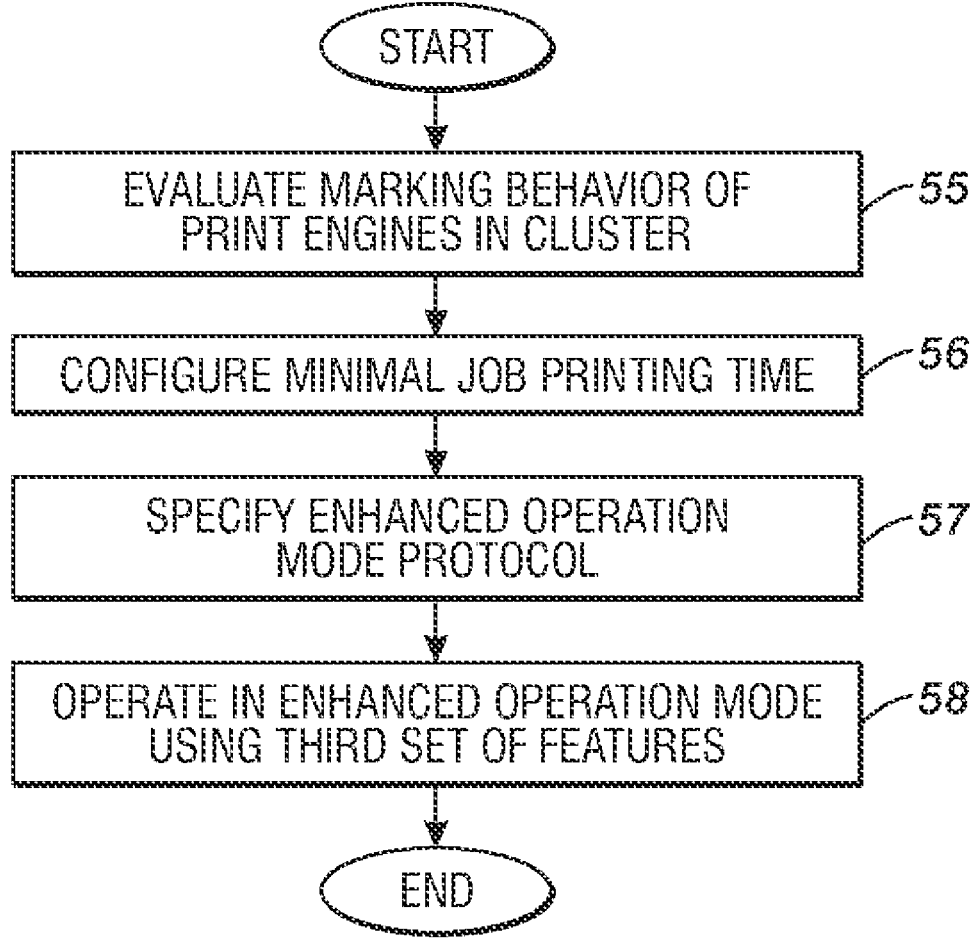
FIG. 1A is a flow diagram depicting an example of the output management system utilizing an enhanced mode of operation and third set of features.

In another example, shown in FIG. 1A, the above-mentioned subject job is sent to the Cluster with the purpose of achieving a "homogenized appearance". Accordingly, the OMS might do the following:

1. Evaluate the marking behavior of the print engines in the Cluster 55 and decide how the job can be printed in the minimal time 56. In this example, the job achieves the greatest output coherence when printed with native mode of the type I printer, and when printed on the type II printer with a mode that "emulates" the appearance of the type I printer. This emulation mode (also referred to herein as "adjusted" or "enhanced" mode), as used in the present example, provides what has been referred to as a "derived" mode of operation.
2. Selection of this enhanced mode 57 might be accomplished by specifying, (a) the desired emulation in a print submission protocol (e.g., a conventional Internet Print Protocol), (b) the desired emulation in a production job ticket (e.g., via a Xerox Print Instruction Format), or (c) using a printer queue or virtual printer that is programmed to apply the emulation mode to all jobs.
3. Operation of this enhanced mode 58 may be accomplished using a third set of features, made available in the second printing system. This third set of features includes at least one more feature than is available in the second set of default features included in the second printing system.

Any of the exemplary methods described above can be used in combination with other methods. For instance, IQI, scheduling and imposition changes could be achieved in a single cluster.

Figure 3:
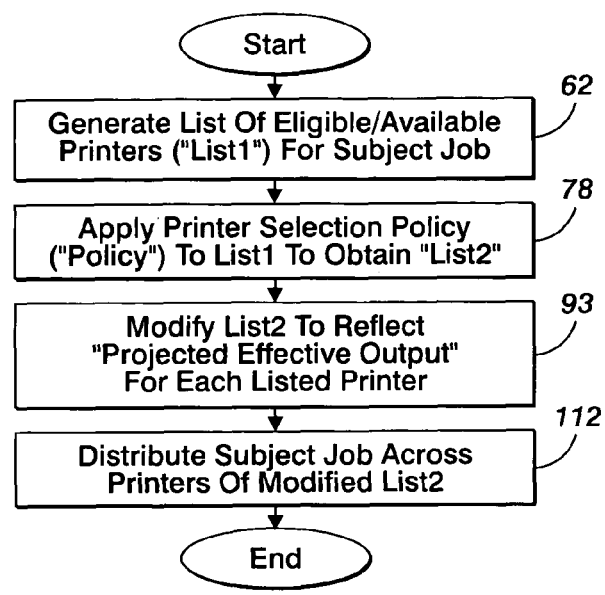
FIGS. 3-6 comprise a series of related flow diagrams depicting a job distribution system suitable for use with the network printing system of FIG. 1.

Referring now to FIGS. 3-6, some of the functionality of the print job distribution application or OMS is described in further detail. Referring first to FIGS. 1 and 3, the OMS initially, at step 62, generates a list of all printers that are eligible and available to print part or all of a given print job. The functionality of step 62 assumes that the server 25 (FIG. 1) includes a list of all printers that might be used in the Cluster, and that the attributes (also referred to below as "features" or "capabilities") of each printer in the Cluster have been provided with the list. In one example, printer configuration files may be collected for each printer in a manner consistent with the teachings of U.S. Pat. No. 5,450,571 to Rosekrans et al., the pertinent portions of which are incorporated herein by reference.

Figure 4:
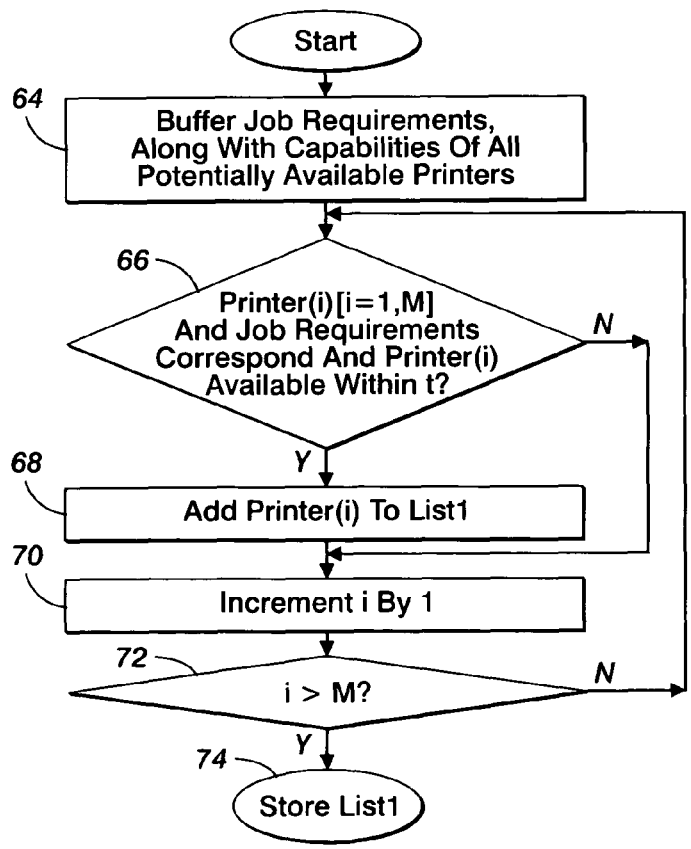

Referring to FIG. 4, the steps associated with implementing step 62 are described. In step 64, the requirements of a job to be distributed to one or more target printers in the Cluster are buffered along with a configuration file for each potentially available printer. In accordance with the disclosed embodiments, a given printer is potentially available if it can be engaged for printing within a selected time period. A description of how the availability of printers is determined in a print-shop environment is provided in U.S. patent application Ser. No. 10/946,756 (Publication No. 20050065830 (published on Mar. 24, 2005)), the pertinent portions of which are incorporated herein by reference.

As contemplated herein, the configuration files, wherever possible, supplement native features with both derived features and remotely available features. A "remotely available feature" might include a feature available "upstream" of the OMS at a supplementary print job processing system. In one example, the remotely available feature might include a font type that is unavailable at any of the printers. The retrieval of remotely available features is described in U.S. Pat. No. 5,220,674 to Morgan et al., the pertinent portions of which are incorporated herein by reference. It will be appreciated by those skilled in the art that a remotely available feature can extend to print ready data, such as one or more fully processed electronic pages. Consequently, in one example, plural-up masters could be provided to one or more printers in the Cluster so that imposition processing would not be required. This could actually increase the effective output rate of a target printer since multiple copies of an image could be printed without actually performing any imposition operations at the target printer. Additionally, it is understood that performance of certain image processing operations might advantageously be performed remotely of the Cluster or OMS.

With job requirements and capabilities of potentially available printers buffered, a suitable eligibility examination is then performed with steps 66, 68, 70 and 72. In particular, for the first available printer in the list of potentially available printers (printer(1) when i=1), the job requirements and printer capabilities of the first printer (native, derived and possible remote) are, at step 66, compared through a process known as "capability [or attribute] matching." An example of capability matching can be found in U.S. Pat. No. 5,467,434 to Hower, Jr. et al., the pertinent portions of which are incorporated herein by reference. If the first printer in the list can meet the requirements of the job and is available within the time interval t, then it is added to "List1" (step 68) and, in any event (which might include bypassing step 68 because the requirements of the subject job do not match the capabilities of the current printer under examination or the same printer is not available within the time interval t), the variable i is incremented (at step 70) so that capability matching with respect to the next printer in the list can, if necessary, be performed. Assuming it is determined, at step 72, that the value of the variable i is less than or equal to M (the value corresponding with the last printer in the list of buffered printers), then the process loops back to step 66 to consider the next printer in the list; otherwise List1 is stored in memory, at step 74, for use by OMS in the job distribution process.

Figure 5:
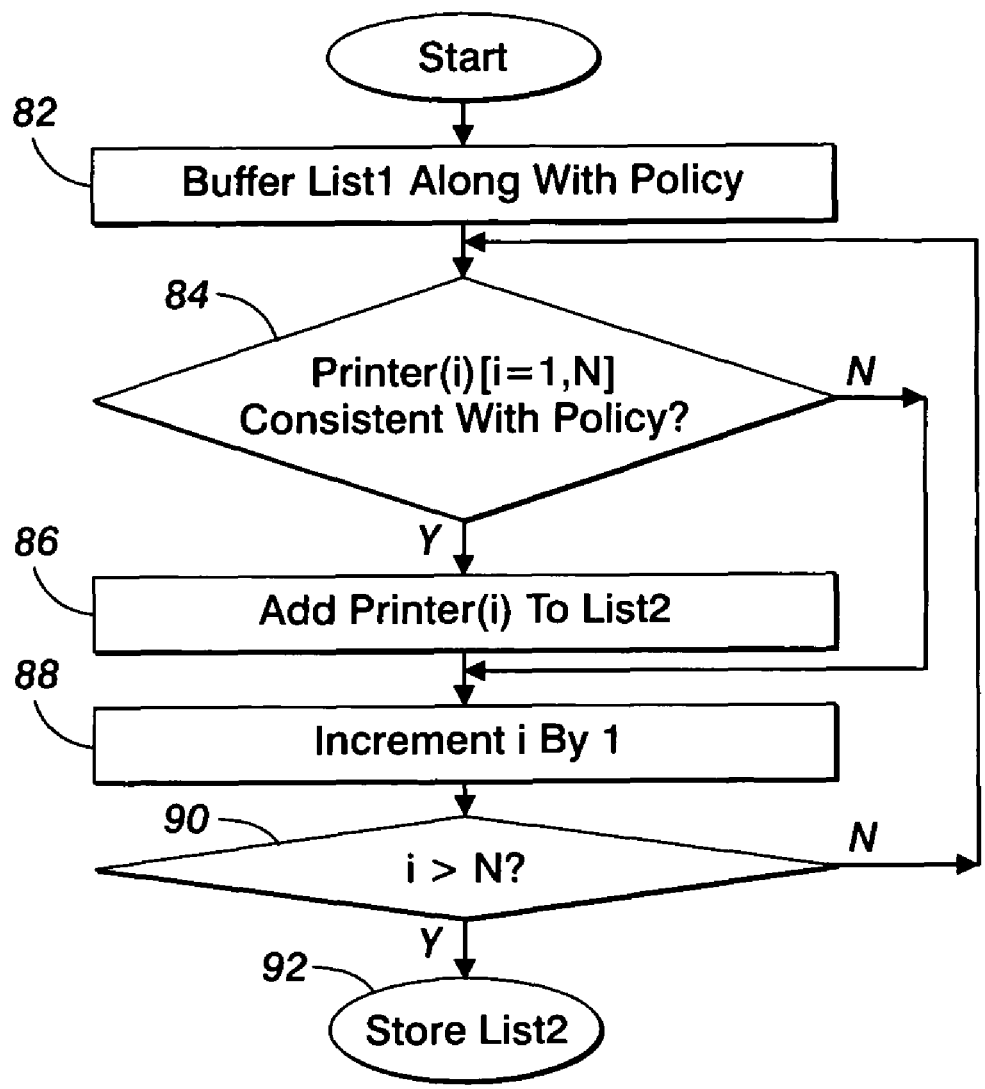

Referring again to FIG. 3, a "printer selection policy (hereinafter referred to simply as 'Policy')" is applied to List1 (step 78) to obtain a List2. Referring to FIG. 5, further description underlying step 78 is provided. At step 82, List1 is buffered for use with the Policy. In one example, the Policy is obtained directly from a system user in one of several forms. In one form, the Policy might be provided through use of "special instructions" in an electronic job ticket accompanying a job. One example of such special instructions is disclosed in each one of U.S. Pat. Nos. 5,130,806 to Reed et al. and 5,524,085 to Bellucco et al., the pertinent portions of which are incorporated herein by reference. Alternatively, the Policy could be provided by way of an OCR compliant form known as "Paper UI." An example of a disclosure relating to such OCR usage is found in U.S. Pat. No. 5,051,779 to Hikawa, the pertinent portions of which are incorporated herein by reference.

In practice, the Policy expresses the preferences of a user. Some examples of such preference follow below:

I. Consistent appearance—consistent appearance may be achieved by using printing equipment with similar rendering and fusing behavior. Common marking and imaging technology is one indicator of appearance.

II. Equivalent running cost—includes click charge and consumable costs.

III. Post printing finishing permitted—a user may be willing to perform post printing finishing (e.g., cutting plural-up output) only for long runs (further disclosure regarding finishing modes may be obtained by reference to U.S. Pat. No. 6,873,426 to Farrell, the pertinent portions of which are incorporated herein by reference).

It should be understood that certain preferences may preclude the use of given printer in a selected print cluster. For instance, either the appearance of a given printer may vary too drastically from other printers in an associated selected print cluster, or the Policy may preclude either the incurring of certain running costs or use of "offline" finishing.

Referring still to FIG. 5, steps 84, 86, 88 and 90 are used to determine which of the printers in List1, if any, are eligible, in view of the Policy, to process a given job. Initially, at step 84, selected capabilities of the first printer (Printer(1), where i=1) are initially considered in view of the Policy for consistency. If, for instance, the job requires to have a certain appearance (e.g., the appearance of a "write white" printer) and the first printer can provide such capability, either through native or derived capability, then that printer is added to the List2 (step 86). If the printer under current consideration (current Printer (i)) cannot be reconciled with the Policy, then step 86 is bypassed so that current Printer(i) is not included on List2. At step 88, i is incremented by 1 and the OMS determines, at step 90, whether i is greater than N. If i is less than or equal to N, then the process loops back to step 84 where the next printer on List1 is examined in view of the Policy. When i exceeds N, List2 is stored, at step 92, for subsequent use.

Referring again to FIG. 3, it should be understood that the rated output of each fully eligible printer can be provided on List2. As described above, however, it should also be understood that a given printer might not, due to one or several operational constraints, be able to achieve its rated output. Thus, for each job, it may be desirable (via step 93) to provide a version of List2 reflecting the "projected effective output" of each printer in a given cluster.

Figure 6:
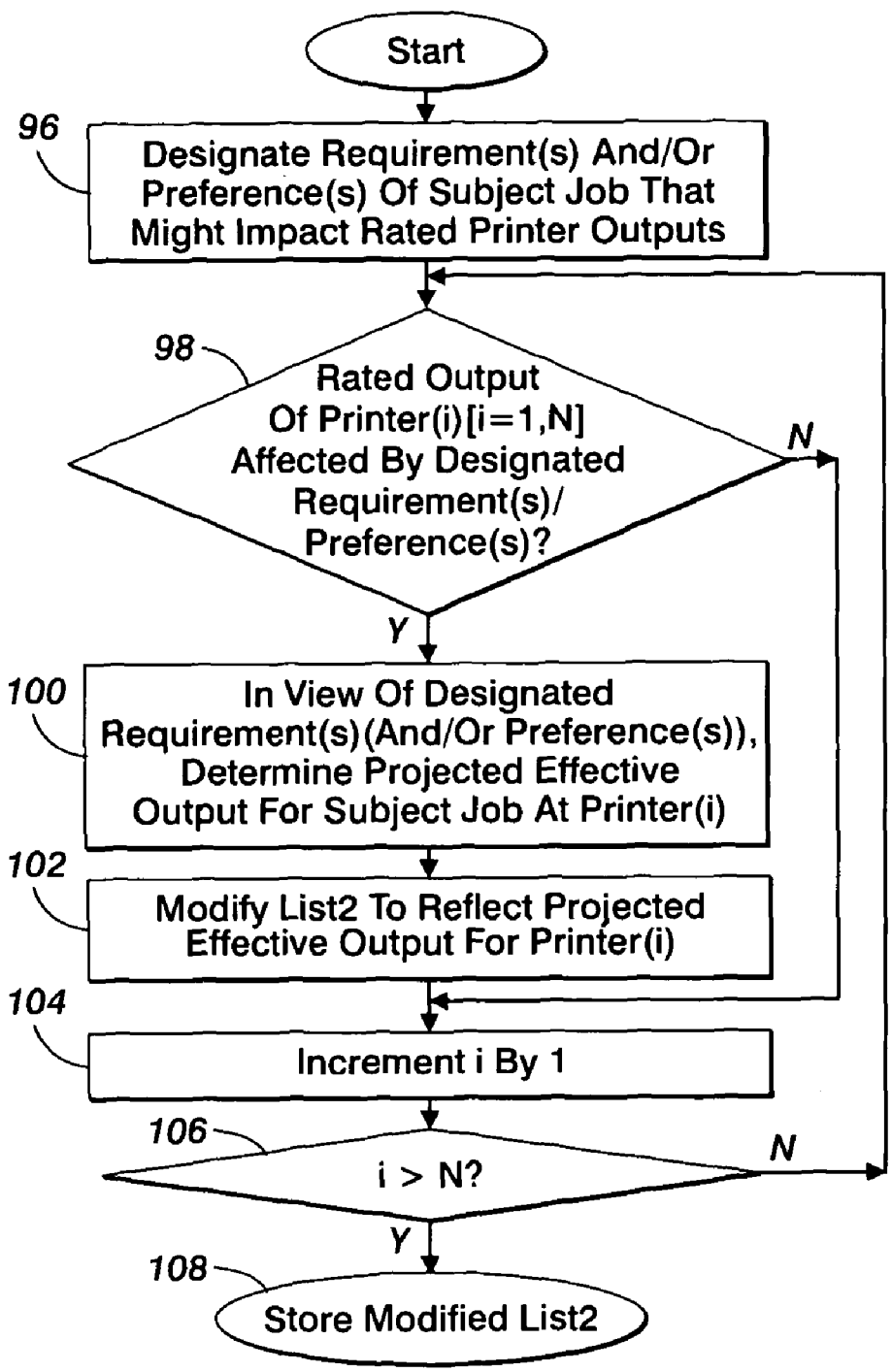

In particular, referring to FIG. 6, prior or pursuant to performing step 96, the OMS might scan a job ticket of a subject job to ascertain any required action (dictated by a requirement(s) or preference(s) of the subject job) that might cause a target printer to operate below its rated output. Generally, job capabilities are nominally determined from job ticketing, but PDL evaluation may also be useful, e.g., evaluation of PostScript® Document Structuring Comments. In the above description, it was noted that many actions, including, for example, appearance emulation, media handling, job color content, plural-up printing, finishing related activities, can cause a target printer to operate at less than rated output. It will be appreciated by those skilled in the art that the actions noted above only constitute a subset of the wide variety of actions that can impact the rated output of a target printer. For instance, all sorts of activities at either the "front end (e.g., image processing related activities)," within the print engine (e.g., media handling activities), or at the output end (e.g., finishing related activities) can lead to a decrease in rated output.

After designating each action that might degrade (or, less frequently, improve) rated output (step 96), the OMS determines, at step 98, whether any one of the designated actions will impact rated output. As in the respective processes of FIGS. 4 and 5, examination begins by setting i to 1 so that Printer(1) is initially considered. If the answer to the question of step 98 is "No," then the process branches to step 104; otherwise, at step 100, the OMS, in view of the designated action(s), determines projected effective output for the subject job at the target printer under current examination (initially Printer(1)). In one contemplated implementation of step 100, the OMS maintains a database with information regarding the effect that a given action might have on the rated output of an associated printer. In those situations where data regarding the impact of actions on a given target printer is unavailable, the OMS may have to employ a heuristic (using information from other related information in the database) to provide a best "guess" as to impact of actions on the given target printer.

Assuming that an action(s) does impact the target printer under examination, the current version of List2 is modified (step 102) to reflect its projected effective output. Subsequently, the value of i is incremented by 1 (step 104) and the process determines whether the value of i is greater than N (step 106). If i is less than or equal to N, then the process loops back to step 98 to consider the next target printer of List2; otherwise the modified version of List2 is stored via step 108.

Referring finally to FIG. 3, a series of job distribution steps is designated with the numeral 112. Examples of how these job distribution steps might be implemented are provided above.

In view of the above description, several features of the disclosed embodiments should be apparent:

I. The disclosed print job distribution system and method employs a robust output management system (OMS). The OMS employs a process that promotes the development and use of clusters in which associated devices can possess a wide range of capabilities. Moreover, the OMS can be used to facilitate the delivery of resources to a cluster, thus providing flexibility with respect to the composition of a cluster. That is, even devices that might seem unsuitable for operation with a cluster can be made eligible by providing resources from remote sources. Finally, use of a policy with user preferences allows, for instance, a consistent appearance to be obtained across a significant number of dissimilar devices II. In one approach, job scheduling on the basis of rated printer outputs permits the use of heterogeneous devices in a cluster that retains its ability to finish a print run in all of the devices at substantially the same time. In another approach, job scheduling accounts for projected effective output rates. These projected rates can be used to accommodate for fluctuations in rated output due to unexpected "overhead" in, among other things, image processing, media handling and finishing. The disclosed job scheduling approaches thereby accommodate for output rates encountered under ideal conditions and for output rates encountered under non-ideal conditions.

III. Improvement in load balancing can be achieved by more fully exploiting the imposition capabilities of devices throughout a cluster. For example, the imposition that can yield the greatest effective page production rate for each capable printer in a cluster may be determined, and the resulting imposition related information used to calculate a common performance metric across the cluster.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A print job distribution system for printing a print job on devices having dissimilar capabilities and marking behaviors; comprising:

a print job distribution controller;

a distributed printing arrangement that communicates with said print job distribution controller, said print job distribution arrangement including a first printing system having a first output rate, a first default operating mode, and a first set of operating attributes, and a second printing system having a second output rate, a second default operating mode, and a second set of operating attributes wherein the first default operating mode corresponds with a first image quality type and wherein the second default operating mode corresponds to a second operating type;

said second printing system having an adjusted operating mode with an effective output rate that differs from said first output rate and said second output rate, wherein the adjusted operating mode corresponds to a third image quality type, wherein the first and third image quality types are substantially similar;

said print job including a set of printing requirements, wherein said print job distribution controller compares said set of printing requirements with each one of said first set of operating attributes, and said second set of operating attributes to determine whether said print job can be completely printed with said distributed printing arrangement, wherein heuristic information from related printer output information predicts an impact on print operating attributes for said distributed printing arrangement; and after said print job distribution controller comparing said printing requirements to each of said first set of operating attributes and said second set of operating attributes, said print job distribution controller dividing said print job into a first print job portion and a second print job portion by said print job distribution controller, wherein said first job portion and said second job portion are sized in proportion to said first output rate and said effective output rate, respectively, wherein said first printing system receives and prints said first job portion, and wherein said second printing system receives and prints said second job portion in said adjusted operating mode, wherein said first job portion and said second job portion are proportionally sized such that said printing of said first and second job portions end substantially simultaneously.

2. The print job distribution system of claim 1 wherein each print produced at the first and second printing systems corresponds with an image quality (IQ) type, and in which each print has an IQ type that is substantially similar to the IQ type of each print produced in said adjusted operating mode.

3. The print distribution system of claim 1 wherein two or more representations of an input document page are provided on a print side during said adjusted operating mode.

4. The print distribution system of claim 1 wherein at least one finishing operation is performed on said second print job portion, and wherein said at least one finishing operation is performed at a site separate from said second printing system.

5. The print job distribution system of claim 1 wherein use of said adjusted operating mode to print the said second print job portion is conditioned on approval of a system user.

6. The print job distribution system of claim 1 wherein a copy of said print job is provided to each one of said first and second printing systems, and wherein instructions regarding a first number of print sets to be printed at said first printing system are provided to said first printing system and instructions regarding a second number of print sets to be printed at said second printing system are provided to said second printing system.

7. The printing job distribution system of claim 1 wherein said print job is a variable print job comprising a first set of records and a second set of records, wherein said first print job portion includes said first set of records, and said second print job portion includes said second set of records.

8. The system of claim 1 further comprising an electronic job ticket comprising a print job level attribute, a page level attribute, and an image level attribute, wherein said electronic job ticket permits a user to program said print job for transmission to said print job distribution controller.

9. The system of claim 1 further comprising a print job operation mode section policy, wherein said print job distribution controller uses said policy to determine whether a second print job portion should be printed in said adjusted operating mode.

10. A print job distribution system for printing a print job on devices having dissimilar capabilities and marking behaviors, comprising:
a print job distribution controller;
a distributed printing arrangement communicating with said print job distribution controller, said print job distribution arrangement including a first printing system operable in a first default operating mode that corresponds with a first output rate, in which a first set of default features is made available and a second printing system operable in a second default operating mode that corresponds with a second output rate in which a second set of default functions is made available and the second output rate is greater than the first output rate wherein the first default operating mode corresponds with a first image quality type and wherein the second default operating mode corresponds to a second operating type;
a print job including a set of printing requirements, wherein said print job distribution controller compares said set of printing requirements of the print job are compared with each one of the first set of operating attributes, the second set of operating attributes, and said effective output rate to determine whether the print job can be completely printed with the distributed printing arrangement, wherein heuristic information from related printer output information predicts an impact on print operating attributes for said distributed printing arrangement;
said second printing system being operable in an enhanced operating mode in which a third set of features is made available, the third set of features including at least one more feature than is available in the second set of default features, wherein the enhanced operating mode corresponds to a third image quality type, wherein the first and third image quality are substantially similar; and
a first print job portion and a second print job portion produced by the print job distribution wherein the first printing system receives and prints the first job portion in the first default operating mode, wherein the second printing system receives and prints the second job portion in the enhanced operating mode, and wherein the first job portion and the second job portion are sized such that the printing of the first and second job portions end substantially simultaneously.

11. The system of claim 10 wherein each print produced at the first and second printing systems corresponds with an image quality (IQ) type, and in which each print has an IQ type that is substantially similar to the IQ type of each print produced in said enhanced operating mode.

12. The system of claim 10 further comprising an electronic job ticket comprising a print job level attribute, a page level attribute, and an image level attribute, wherein said electronic job ticket permits a user to program said print job for transmission to said print job distribution controller.

13. The system of claim 10 further comprising a print job operation mode section policy, wherein said print job distribution controller uses said policy to determine whether a second print job portion should be printed in said adjusted operating mode.

14. A method for managing a print job in a distributed printing system, comprising:
utilizing a first printing system having a first default operating mode with a first output rate, a second printing system having a second default operating mode with a second output rate, wherein said first and second printing systems have dissimilar capabilities and marking behaviors wherein the first default operating mode corresponds with a first image quality type and wherein the second default operating mode corresponds to a second operating type;
determining that the second printing system has the capability to operate in an adjusted operating mode with an effective output rate that differs from either the first rated output or the second rated output, wherein heuristic information from related printer output information predicts an impact on print operating attributes for said distributed printing arrangement, wherein the adjusted operating mode corresponds to a third image quality type, wherein the first and third image quality types are substantially similar;
using a print job operation mode policy to determine whether the second print job portion should be printed in the adjusted operating mode;

splitting the print job into first and second job portions in such a way that when a) both the first and second print job portions are communicated to the distributed printing arrangement, (b) the first print job portion is printed at the first printing system in the first default operating mode, and (c) the second print job portion is printed at the second printing system in the adjusted operating mode; printing of the first and second print job portions end substantially simultaneously; and dividing a first print job portion and a second print job portion produced by the print job distribution wherein the first printing system receives and prints the first job portion in the first default operating mode, wherein the second printing system receives and prints the second job portion in the adjusted operating mode and wherein the first job portion and the second job portion are sized such that the printing of the first and second print job portions end substantially simultaneously.

15. The method of claim 14 further comprising causing only one representation of an input document page to be provided on a print side during the second default operating mode, and causing two or more representations of an input document page to be provided on a print side during the adjusted operating mode.

16. The method of claim 14 further comprising performing at least one finishing operation on the second print job portion at a site separate from the second printing system.

17. The method of claim 14 wherein the print job is a variable print job comprising a first set of records and a second set of records, further comprising associating the first print job portion with the first set of records, and the second print job portion with the second set of records.

18. The system of claim 14 wherein each print produced at the first and second printing systems corresponds with an image quality (IQ) type, and in which each print has an IQ type that is substantially similar to the IQ type of each print produced in said adjusted operating mode.

19. The system of claim 14 further comprising an electronic job ticket comprising a print job level attribute, a page level attribute, and an image level attribute, wherein said electronic job ticket permits a user to program said print job for transmission to said print job distribution controller.

20. The system of claim 14 further comprising a print job operation mode section policy, wherein said print job distribution controller uses said policy to determine whether a second print job portion should be printed in said adjusted operating mode.

* * * * *